(12) United States Patent
Tosaki et al.

(10) Patent No.: US 11,678,061 B2
(45) Date of Patent: Jun. 13, 2023

(54) IMAGE PICKUP APPARATUS CAPABLE OF SUPPRESSING OCCURRENCE OF DELAY IN EXPOSURE CONTROL, CONTROL METHOD THEREFOR, AND STORAGE MEDIUM

(71) Applicant: CANON KABUSHIKI KAISHA, Tokyo (JP)

(72) Inventors: Takumi Tosaki, Kanagawa (JP); Keisuke Matsuno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/150,693

(22) Filed: Jan. 15, 2021

(65) Prior Publication Data

US 2021/0227118 A1 Jul. 22, 2021

(30) Foreign Application Priority Data

Jan. 21, 2020 (JP) .............................. JP2020-007678

(51) Int. Cl.
*H04N 23/73* (2023.01)
*H04N 23/72* (2023.01)

(52) U.S. Cl.
CPC ............. *H04N 23/73* (2023.01); *H04N 23/72* (2023.01)

(58) Field of Classification Search
CPC .... H04N 5/2353; H04N 5/2352; H04N 23/73; H04N 23/72
See application file for complete search history.

(56) References Cited

U.S. PATENT DOCUMENTS

| 6,720,995 B1* | 4/2004 | Kaneda .................. H04N 5/238 348/E5.04 |
| 8,736,748 B2* | 5/2014 | Takita .................... H04N 5/238 348/362 |
| 2007/0065135 A1* | 3/2007 | Takei ....................... G03B 7/08 396/241 |
| 2009/0245685 A1* | 10/2009 | Makii ................ H04N 5/23248 382/276 |

(Continued)

FOREIGN PATENT DOCUMENTS

| JP | 2006135479 A | * | 5/2006 |
| JP | 2012165068 A | | 8/2012 |

*Primary Examiner* — Jason A Flohre
(74) *Attorney, Agent, or Firm* — Rossi, Kimms & McDowell LLP

(57) ABSTRACT

An image pickup apparatus capable of suppressing occurrence of a delay in an exposure control when the exposure control is performed by selectively changing an exposure condition among a plurality of exposure conditions. In a transition period from when the exposure control for changing a first exposure condition according to a target exposure at a time of image pickup of the subject is started until the exposure reaches the target exposure, another exposure condition other than the first exposure condition is changed so that an exposure changing speed of the first exposure condition is compensated for. When the exposure is changeable based on a program diagram and when the first exposure condition is changed, control is provided so that a second exposure condition to be changed immediately after changing the first exposure condition is used to compensate for the exposure changing speed of the first exposure condition.

11 Claims, 8 Drawing Sheets

(56) References Cited

U.S. PATENT DOCUMENTS

| | | | |
|---|---|---|---|
| 2013/0188074 A1* | 7/2013 | Nakabayashi | H04N 5/238 |
| | | | 348/223.1 |
| 2014/0178061 A1* | 6/2014 | Saita | G03B 7/0805 |
| | | | 396/241 |
| 2014/0247386 A1* | 9/2014 | Takagi | H04N 5/238 |
| | | | 348/362 |
| 2017/0230583 A1* | 8/2017 | Kudo | H04N 5/2353 |
| 2018/0027163 A1* | 1/2018 | Uchida | H04N 5/232 |
| | | | 348/361 |
| 2018/0234605 A1* | 8/2018 | Hisamoto | H04N 5/2352 |

\* cited by examiner

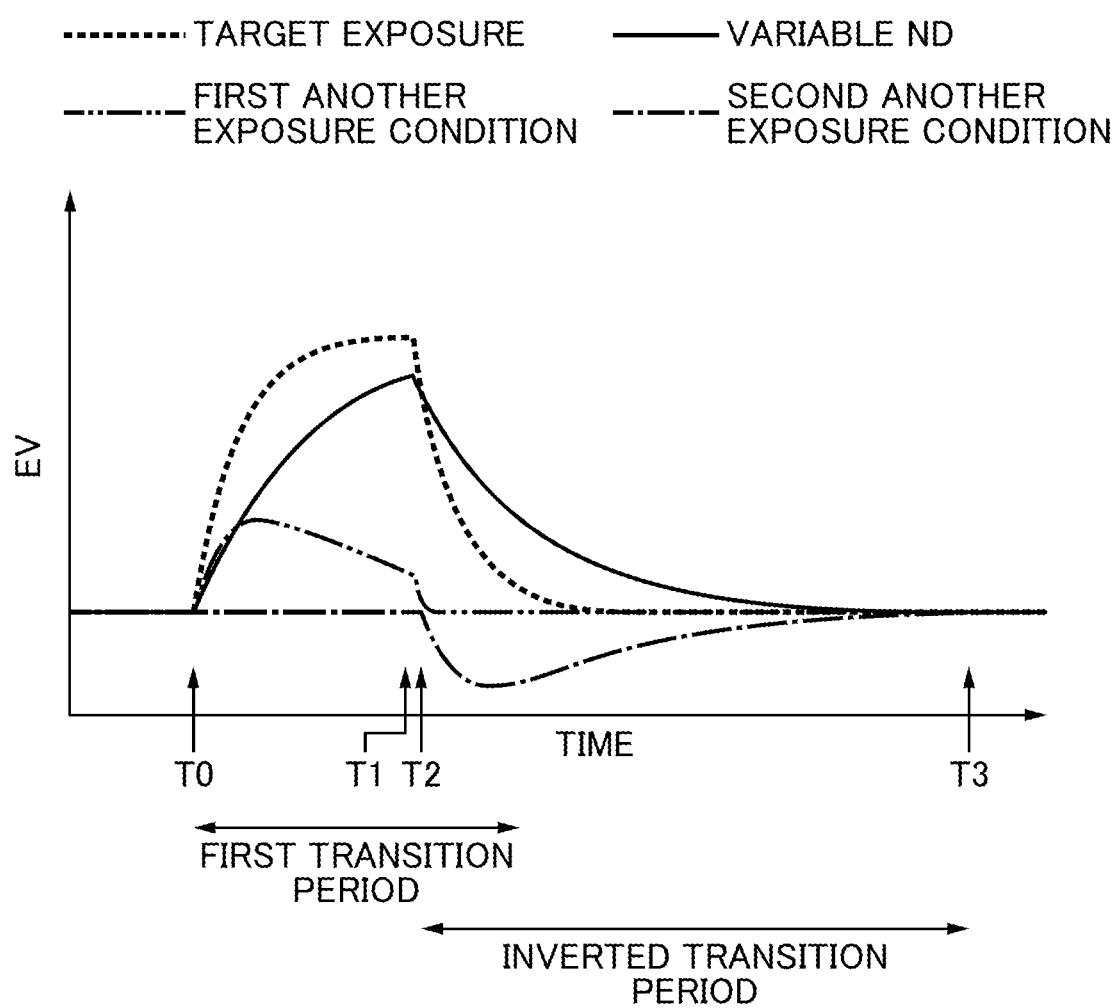

IMAGE PICKUP APPARATUS CAPABLE OF SUPPRESSING OCCURRENCE OF DELAY IN EXPOSURE CONTROL, CONTROL METHOD THEREFOR, AND STORAGE MEDIUM

BACKGROUND OF THE INVENTION

Field of the Invention

The present invention relates to an image pickup apparatus capable of suppressing occurrence of a delay in an exposure control, a control method therefor, and a storage medium.

Description of the Related Art

According to the technology in Japanese Laid-Open Patent Publication (kokai) No. 2012-165068, an image pickup apparatus to which an interchangeable lens having an image pickup optical system including a diaphragm is attachable is capable of communicating with the interchangeable lens. According to the technology in Japanese Laid-Open Patent Publication (kokai) No. 2012-165068, in image pickup, an exposure control of the image pickup apparatus is performed by using a response time from when a control signal for the diaphragm whose exposure is controllable to obtain a target exposure is transmitted until the diaphragm is driven.

The diaphragm used to change the exposure in the image pickup apparatus is capable of making a high-speed response. Therefore, even when the exposure control of the image pickup apparatus is performed based on the response time of the diaphragm as disclosed in Japanese Laid-Open Patent Publication (kokai) No. 2012-165068, the exposure control does not take much time. However, a high-speed response same as that of the diaphragm is not necessarily obtainable under an exposure condition which can be used for controlling the exposure of the image pickup apparatus. In an image pickup apparatus which picks up a movie and a high-quality still image, for example, a transmittance variable element such as an electrochromic element (EC element) and a variable ND (Neutral density) filter is used as a means to change the exposure condition at a time of image pickup in some cases. In these transmittance variable elements capable of changing their transmittances by an electrical control, an exposure changing speed after start of the exposure control is slower than an exposure changing speed of the diaphragm of the image pickup apparatus in many cases in present circumstances. When the transmittance variable element of this type is used for the exposure control of the image pickup apparatus, a delay occurred due to a responsiveness of the transmittance variable element becomes large, which decreases usability for a user. By additionally employing the transmittance variable element in the exposure control of the image pickup apparatus, it may be possible to, for example, expand an adjustable range of the exposure. However, the responsiveness on the exposure control is deteriorated. Moreover, the responsiveness of the transmittance variable element is likely to change greatly with its temperature. Accordingly, the responsiveness of the transmittance variable element may be significantly decreased depending on an environment where the image pickup apparatus is assumed to be used. When the image pickup apparatus is set so that the exposure control of the image pickup apparatus is performed assuming such the worst case, the delay in the exposure control of the image pickup apparatus occurred due to the responsiveness of the transmittance variable element becomes significantly large.

In the image pickup apparatus of this type, it is required to suppress an increase in the delay in the exposure control of the image pickup apparatus even when the transmittance variable element whose exposure changing speed is slow, for example, is used for the exposure control of the image pickup apparatus.

SUMMARY OF THE INVENTION

The present invention provides an image pickup apparatus capable of suppressing occurrence of a delay in an exposure control when the exposure control is performed by selectively changing an exposure condition among a plurality of exposure conditions, a control method therefor, and a storage medium.

Accordingly, the present invention provides an image pickup apparatus capable of changing a plurality of exposure conditions for changing an exposure at a time of image pickup of a subject, the image pickup apparatus comprising at least one processor or circuit, the at least one processor or circuit functioning in accordance with a program stored in a memory as a control unit that calculates a target exposure at the time of image pickup of the subject and controls the exposure according to the target exposure, wherein, in a transition period from when control of the exposure for changing a first exposure condition according to the target exposure is started until the exposure reaches the target exposure, the control unit changes another exposure condition other than the first exposure condition among the plurality of exposure conditions so that an exposure changing speed of the first exposure condition is compensated for, and in a case where the exposure is changeable based on a program diagram which defines a control order and a control range for the plurality of exposure conditions and a case where the control unit changes the first exposure condition, the control unit provides control so that an exposure condition to be changed immediately after changing the first exposure condition with respect to a change in a brightness of the subject is used as the another exposure condition to compensate for the exposure changing speed of the first exposure condition.

According to the present invention, even when the exposure control is performed by selectively changing the exposure condition among the plurality of exposure conditions, occurrence of the delay in the exposure control can be suppressed.

Further features of the present invention will become apparent from the following description of exemplary embodiments with reference to the attached drawings.

BRIEF DESCRIPTION OF THE DRAWINGS

FIG. 8 is a graph showing exposure control characteristics in the exposure control for compensating for the response delay of the variable ND filter in FIG. 1 in an image pickup apparatus according to a third embodiment of the present invention.

DESCRIPTION OF THE EMBODIMENTS

The present invention will now be described in detail below with reference to the accompanying drawings showing embodiments thereof.

First Embodiment

Figure 1:
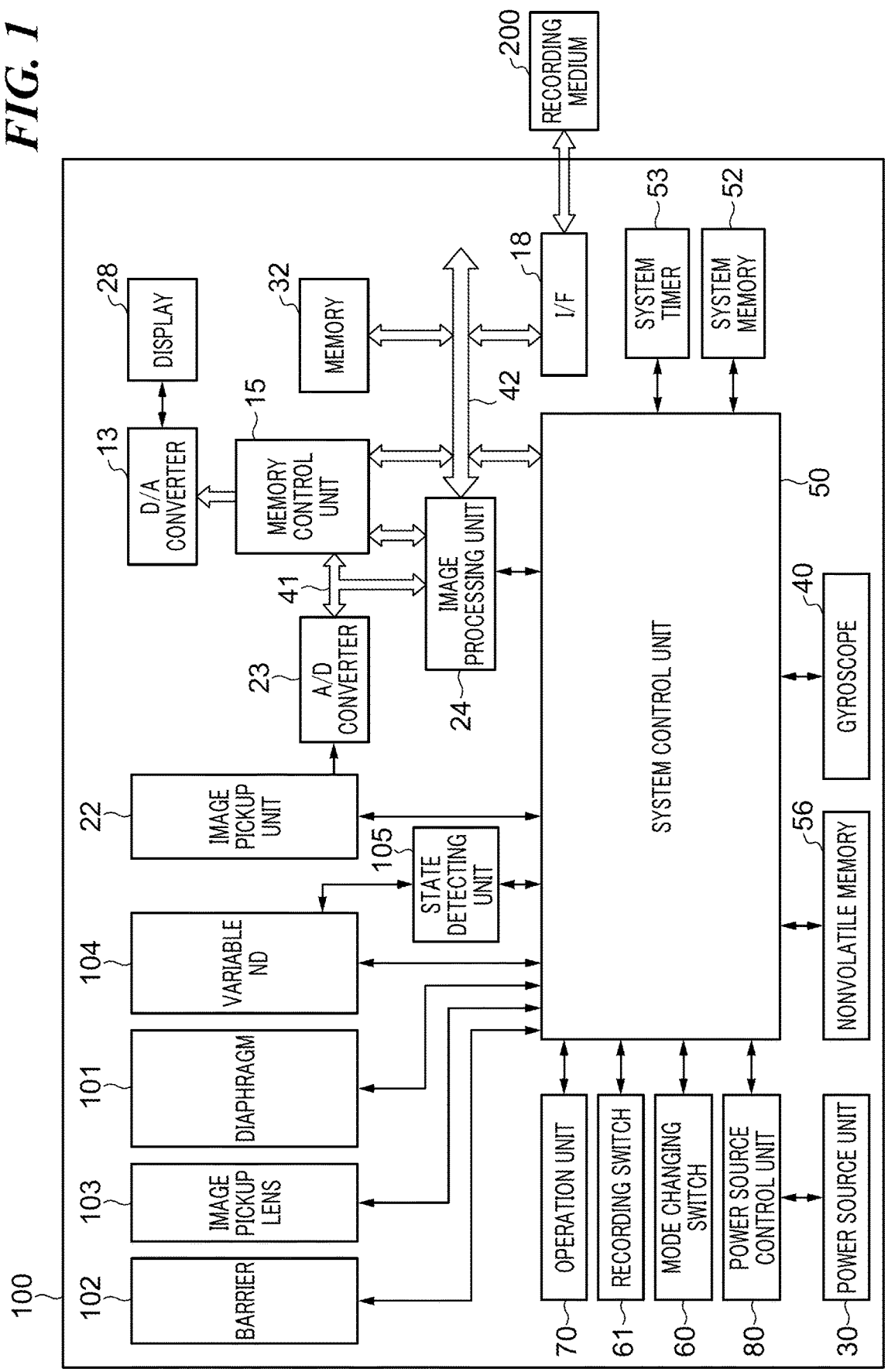
FIG. 1 is a block diagram showing a configuration of an image pickup apparatus according to embodiments of the present invention.

FIG. 1 is a block diagram showing a configuration of an image pickup apparatus 100 according to embodiments of the present invention. The image pickup apparatus 100 in FIG. 1 picks up a subject and so on by an image pickup unit 22 and records a picked-up image in a memory 32 or a recording medium 200. The image pickup apparatus 100 includes, as an image pickup optical system that corrects a light of a subject and so on, a barrier 102, an image pickup lens 103, a diaphragm 101, and a variable ND filter 104. The image pickup optical system is removably attached to a main body of the image pickup apparatus 100. The image pickup apparatus 100 includes, as post-processing units of the image pickup unit 22, an A/D convener 23 connected to the image pickup unit 22, an image processing unit 24, a memory control unit 15, and the memory 32. The A/D converter 23, the image processing unit 24, and the memory control unit 15 are mutually connected via a dedicated data bus 41. The image processing unit 24, the memory control unit 15, and the memory 32 are mutually connected by a memory bus 42. An interface (I/F) 18 is additionally connected to the memory bus 42. The recording medium 200 is removably connected to the interface 18, the D/A converter 13 is connected to the memory control unit 15, and a display unit 28 is connected to the D/A converter 13.

The image pickup apparatus 100 also includes a system control unit 50 that controls overall operations of the image pickup apparatus 100. The system control unit 50 is, for example, a CPU. In order to control a process from image pick-up to recording in the image pickup apparatus 100, the barrier 102, the image pickup lens 103, the diaphragm 101, the variable ND filter 104, the image pickup unit 22, and the image processing unit 24 are connected to the system control unit 50. A state detecting unit 105, a system timer 53, a system memory 52, a gyroscope 40, a non-volatile memory 56, an operation unit 70, a recording switch 61, a mode changing switch 60, and a power source control unit 80 are also connected to the system control unit 50. A power source unit 30 for the image pickup apparatus 100 is connected to the power source control unit 80.

The image pickup lens 103 as the image pickup optical system is a lens group including a zoom lens, a focus lens, and a shift lens, and forms a subject image on the image pickup unit 22. The diaphragm 101 is arranged on an optical axis extending from the image pickup lens 103 to the image pickup unit 22 and adjusts an amount of light collected to the image pickup unit 22. The variable ND filter 104 is arranged on the optical axis extending from the image pickup lens 103 to the image pickup unit 22, and an optical density (hereinafter, merely referred to as "density") of the variable ND filter 104 is changed (adjusted) when its transmittance is changed by the electrical control. An exposure condition for the variable ND filter 104 is changeable under a first exposure condition. The amount of light collected to the image pickup unit 22 is increased or reduced depending on the transmittance of the variable ND filter 104. For the variable ND filter 104, a liquid crystal element and an organic electrochromic (EC) element are used, for example, however, other materials may also be used for the variable ND filter 104. The barrier 102 is arranged on the optical axis extending from the image pickup lens 103 to the image pickup unit 22 and covers the image pickup optical system. Accordingly, the barrier 102 prevents smudge of and damage to the image pickup optical system including the image pickup lens 103, the diaphragm 101, and the image pickup unit 22.

The image pickup unit 22 to which light is collected by the image pickup optical system is, for example, a CCD element or a CMOS element that converts an optical image to an electrical signal. The image pickup unit 22 has a function such as a charge accumulation control by an electronic shutter, a change of an analog gain, and a change of a read rate. The A/D converter 23 is connected to the image pickup unit 22 and converts an analog signal output from the image pickup unit 22 to a digital signal. The image processing unit 24 performs image processes such as a pixel interpolation process, a resizing process such as a reducing process, a color conversion process, a gamma correction process, and a digital gain adding process on digital data output from the A/D converter 23. The image processing unit 24 also may analyze an image concerning the image processes to generate, for example, brightness information, color information, and detection information such as a characteristic subject of the image, and output these pieces of information to the system control unit 50. The image processing unit 24 also may perform the same image processes and analyzing process on digital data output from the memory control unit 15. An image picked-up by the image pickup unit 22 is converted to digital data by the A/D converter 23, and subjected to a predetermined image process by the image processing unit 24. As a result, data of the picked-up image is obtained.

The memory 32 records the data of the picked-up image generated based on image pickup by the image pickup unit 22. The memory 32 may record image data to be displayed on the display unit 28 and record a moving image as a video memory. Moreover, the memory 32 has a memory capacity enough for storing moving images and sounds for a predetermined period, and is a non-volatile semiconductor memory, for example. The recording medium 200 is removably connected to the interface 18. The recording medium 200 is a non-volatile semiconductor memory or a magnetic disk. The memory 32 and the interface 18 are connected to the memory control unit 15 by the memory bus 42. The image processing unit 24 and the system control unit 50 may be connected to the memory bus 42. The memory control unit 15 may access the memory 32 or the recording medium 200 via the memory bus 42, record the data of the picked-up image in the memory 32 or the recording medium 200, and read recorded data of the picked-up image.

The display unit 28 is, for example, an LCD. The D/A converter 13 is connected to the display unit 28 and the memory control unit 15. The D/A converter 13 converts digital data of an image obtained from the memory control unit 15 to an analog signal and outputs the analog signal to the display unit 28. As a result, an image being picked-up by the image pickup unit 22 and an image picked-up past and recorded in the memory 32 are displayed on the display unit 28. The display unit 28 may function as an electronic viewfinder by displaying the image being picked-up by the image pickup unit 22.

The non-volatile memory 56 is electrically erasable/recordable, and for example, an EEPROM. The non-volatile memory 56 records data such as a computer-readable program executed by the system control unit 50 and data such as a constant for an operation used when the program is executed. The system memory 52 is, for example, a RAM. The system control unit 50 is, for example, a CPU. The CPU expands a program read from the non-volatile memory 56 on the system memory 52 and executes the same. As a result, the CPU functions as the system control unit 50 which controls overall operations of the image pickup apparatus 100.

The system control unit 50 controls, for example, the image pickup unit 22 so as to control image pickup of a still image or a moving image by the image pickup apparatus 100. Additionally, the system control unit 50 controls, for example, the D/A converter 13, the display unit 28, and the memory control unit 15 so as to display an image being picked-up by the image pickup unit 22 on the display unit 28. After acquiring various types of information from the image processing unit 24, the system control unit 50 performs the exposure control, a focus control, and a white balance control of the image pickup apparatus 100 so as to enable image pick-up suitable for a current situation of the subject. As a result, a TTL (Through-the-Lens) AF (auto focusing) process, an AE (Auto Exposure) process, an AWB (Auto White Balance) process, and so on are performed in the image pickup apparatus 100.

In the AE process, the system control 50 calculates a target exposure at a time of pickup of the subject and controls an exposure according to the calculated target exposure. Specifically, the system control unit 50 performs a drive changing process for the diaphragm 101, an accumulation time period changing process that changes an accumulation time period corresponding to a shutter speed by the image pickup unit 22, and a gain changing process by the image processing unit 24, so as to obtain the target exposure suitable for image pickup. In the present embodiment in particular, a density of the variable ND filter 104 is controlled as an exposure condition in the exposure control of the image pickup apparatus 100. As a result, the exposure of the image pickup apparatus 100 reaches the target exposure suitable for image pickup. More specifically, the system control unit 50 calculates a predetermined exposure with which a brightness of a subject becomes a brightness set in advance, as a target value (target exposure) in the exposure control, based on a photometry result of the subject. Then, the system control unit 50 selectively changes the exposure condition from among the plurality of exposure conditions so as to control the exposure at the time of image pickup of the subject according to the target exposure. It should be noted that in the present embodiment, a f-number of the diaphragm 101, an accumulation time period (shutter speed) in the image pickup unit 22, and an image capturing sensitivity (so called ISO sensitivity) in the image pickup unit 22 and the image processing unit 24 are changeable as the plurality of exposure conditions other than the density of the variable ND filter 104 described earlier. Each of exposure changing means to be described later corresponds to each of parts that operate to change the above exposure conditions.

A state detecting unit 105 detects the density of the variable ND filter 104 as an exposure state detecting unit that detects and acquires a state of the variable ND filter 104 which is a first exposure changing means. The state detecting unit 105 may estimate and acquire the state of the variable ND filter 104. Since the density of the variable ND filter 104 easily changes depending on the temperature of the variable ND filter 104, the state detecting unit 105 as the exposure state detecting unit may detect or estimate the temperature of the variable ND filter 104 as well as the density of the variable ND filter 104. The state detecting unit 105 outputs a detection result of the state of the variable ND filter 104 to the system control unit 50 as a detection signal. The system control unit 50 performs the exposure control over the variable ND filter 104 based on the detected or estimated density or temperature of the variable ND filter 104. It should be noted that at the time of the exposure control over the variable ND filter 104, the system control unit 50 may additionally perform the drive changing process of the diaphragm 101, the accumulation time period changing process by the image pickup unit 22, and the gain changing process by the image processing unit 24. The exposure condition changes through these changing processes. As a result, the response delay caused by changing the transmittance of the variable ND filter 104, which is capable of changing its transmittance by the electrical control, can be compensated for by changing another exposure condition.

The system timer 53 measures a time and time period and outputs the measured time and time period to the system control unit 50. The gyroscope 40 detects a motion of the image pickup apparatus 100 and outputs the detected motion of the image pickup apparatus 100 to the system control unit 50. The system control unit 50 corrects a deviation of the optical axis due to, for example, the motion of the image pickup apparatus 100 during image pickup. The system control also corrects an image blur by operating the shift lens of the image pickup lens 103 or by deviating an image in the image processing unit 24.

The mode changing switch 60 is a switch for changing an operation mode of the image pickup apparatus 100. Examples of the operation modes of the image pickup apparatus 100 include a moving image recording mode, a still image recording mode, and a reproduction mode. The moving image recording mode and the still image recording mode include an automatic image pickup mode, an automatic scene determination mode, a manual mode, a various scene mode used for image pickup settings for each scene, a program AE mode, and a custom mode. The mode changing switch 60 outputs an operation signal based on a user operation to the system control unit 50. Upon receiving the operation signal from the mode changing switch 60, the system control unit 50 switches the operation mode of the image pickup apparatus 100 and changes settings of the image pickup apparatus 100. The recording switch 61 is a switch for changing a state of the image pickup apparatus 100 between an image pickup standby state and an image pickup state. When the recording switch 61 is turned ON, the system control unit 50 performs an image pickup control, that is, a control to perform a sequence of processes from reading of a signal from the image pickup unit 22 to writing moving image data in, for example, the recording medium 200. The operation unit 70 has a plurality of operation buttons provided corresponding to function icons displayed on an operation screen of the display unit 28. The operation buttons are capable of functioning as, for example, an end button, a return button, an image feed button, a jump button, a narrowing button, an attribute changing button, and a menu button based on corresponding function icons. When, for example, an operation button as the menu button is operated, the operation unit 70 outputs an operation signal to the system control unit 50. The system control unit 50 displays a menu screen as the operation screen on the display unit 28.

The power source unit 30 is a primary battery such as an alkali battery and a lithium battery, a secondary battery such as a NiCd battery, a NiMH battery, and a Li ion battery, or an AC adapter, and supplies power to each part of the image pickup apparatus 100. The power source control unit 80 controls power supply by the power source unit 30. Moreover, the power source control unit 80 may include, for example, a battery detection circuit, a DC-DC converter, and a switch circuit which switches an energized block, and detect presence or absence of a battery, a type of the battery, and a battery capacity. The power source control unit 80 controls operation/stopping of the DC-DC converter based on a detection result or an instruction from the system control unit 50.

Figure 2:
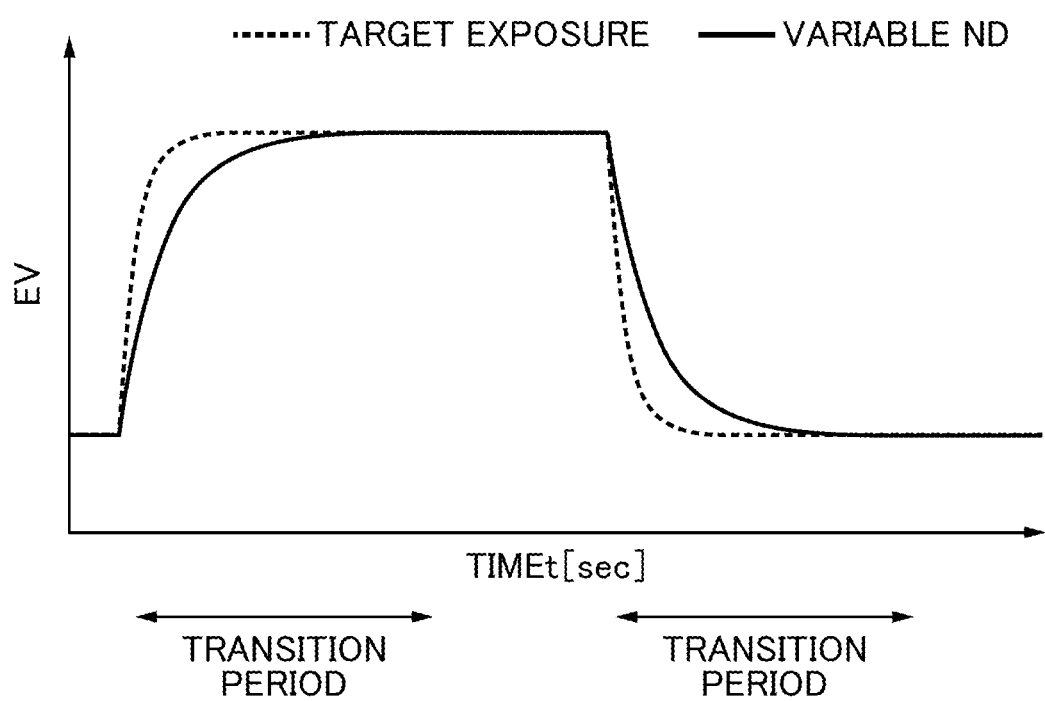
FIG. 2 is a graph showing exposure changing characteristics in an exposure control by using a variable ND filter in FIG. 1.

FIG. 2 is a graph showing exposure changing characteristics in the exposure control by using the variable ND filter 104 in FIG. 1. In FIG. 2, an axis of abscissa indicates a time, and an axis of ordinate indicates an EV (Exposure Value) corresponding to an exposure set for the image pickup apparatus 100. Moreover, in FIG. 2, a continuous line indicates an exposure changing characteristic line of the variable ND filter 104, and a dashed line indicates a changing characteristic line of the target exposure. The changing characteristic line of the target exposure may set for the image pickup apparatus 100 as its specification or may be settable by the user. The changing characteristic line of the target exposure may be same as or may follow an exposure changing characteristic line of, for example, the diaphragm 101 of the image pickup apparatus 100. When the diaphragm 101 is controlled, an exposure changing speed after the start of control is fast. On the contrary, an exposure changing speed based on the density of the variable ND filter 104 after the start of control is slow. Accordingly, when the variable ND filter 104 is used for the exposure control of the image pickup apparatus 100, the exposure changing speed after the start of the control over the variable ND filter 104 is slower than that in a case where the diaphragm 101 of the image pickup apparatus 100 is controlled.

Figure 3:
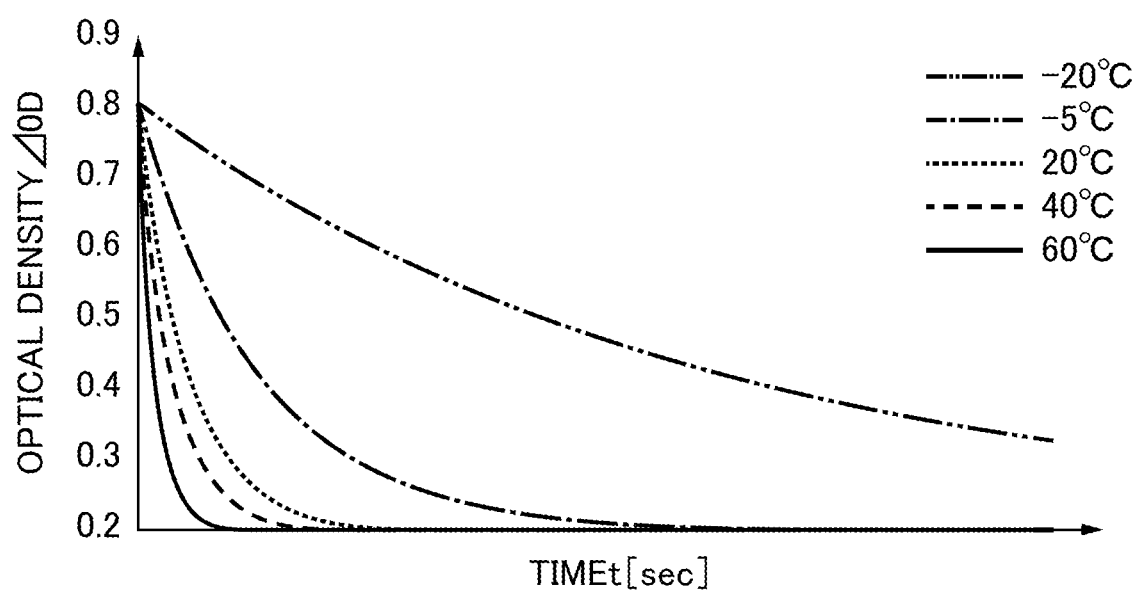
FIG. 3 is a graph showing exposure changing characteristics each of which changes depending on a temperature of the variable ND filter in FIG. 1.

FIG. 3 is a graph showing exposure changing characteristics each of which changes depending on the temperature of the variable ND filter 104 in FIG. 1, and showing an example of the exposure changing characteristics of the variable ND filter 104 in an achromatic process. In FIG. 3, an axis of abscissa indicates a time, and an axis of ordinate indicates the density of the variable ND filter 104. Moreover, in FIG. 3, a two-dot chain line indicates a case of −20° C., a one-dot chain line indicates a case of −5° C., a dotted line indicates a case of 20° C., a dashed line indicates a case of 40° C., and a continuous line indicates a case of 60° C. Concerning the density of the variable ND filter 104, the higher the temperature of the variable ND filter 104 becomes, the faster the exposure changing speed after the start of the control becomes.

As described above, in the variable ND filter 104 as the transmittance variable element capable of changing its transmittance by the electrical control, the exposure changing speed after the start of control is slower than a target exposure changing speed of an exposure condition in many cases in present circumstances. When such a variable ND filter 104 is used for the exposure control of the image pickup apparatus 100, the delay occurred due to the responsiveness of the variable ND filter 104 is large, and thus a usability is decreased. In the image pickup apparatus 100, it is possible to, for example, expand the adjustable range of the exposure by adding the exposure control based on the density of the variable ND filter 104. In this case, however, the responsiveness of the exposure control of the image pickup apparatus 100 gets worse. Moreover, the responsiveness of the variable ND filter 104 largely changes depending on the temperature of the variable ND filter 104. Therefore, when the image pickup apparatus 100 is assumed to use under an environment of −20° C., for example, the responsiveness of the variable ND filter 104 is significantly lowered. If the exposure control of the image pickup apparatus 100 is performed assuming such the worst case, the delay in the exposure control of the image pickup apparatus 100 occurred due to the responsiveness of the variable ND filter 104 becomes significantly large. Therefore, in the image pickup apparatus 100, an increase in the delay in the exposure control of the image pickup apparatus 100 is desired to be suppressed in a case where the transmissive variable element such as the variable ND filter 104 having a slow exposure changing speed is used for the exposure control of the image pickup apparatus 100.

Figure 4:
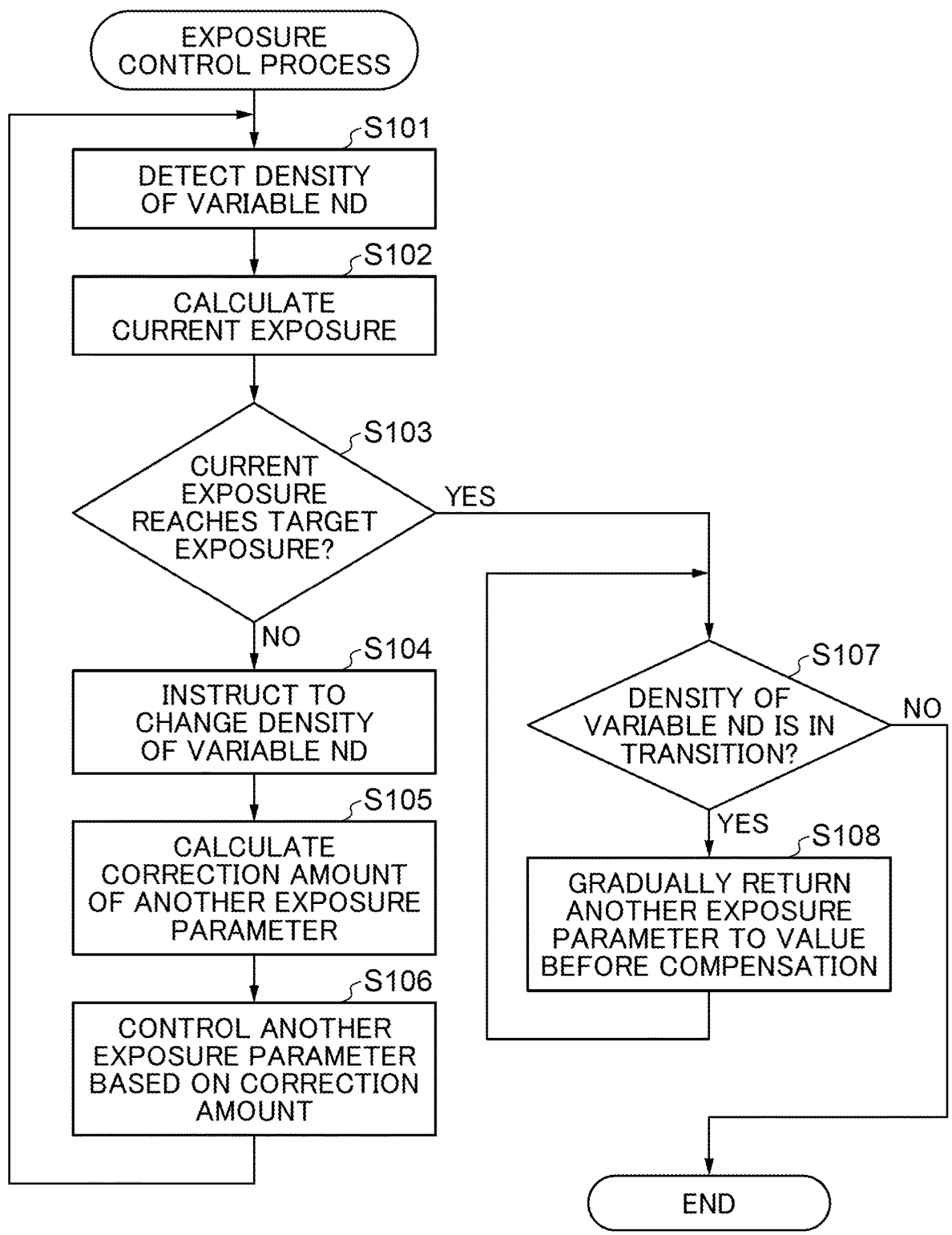
FIG. 4 is a flowchart showing an example of an exposure control process for compensating for a response delay of the variable ND filter according to a first embodiment.

FIG. 4 is a flowchart showing an example of an exposure control process for compensating for the response delay of the variable ND filter 104 according to the first embodiment. The process in FIG. 4 is performed when the system control unit 50 changes a first exposure condition for the variable ND filter 104 in the AE process according to the target exposure. In one AE process that controls the exposure of the image pickup apparatus 100, the system control unit 50 may perform the process in FIG. 4 repeatedly for multiple times. The system control unit 50 may determine the exposure condition for the variable ND filter 104 based on a user operation to the operation unit 70 or a photometry value obtained by the image processing unit 24.

In step S101, the system control unit 50 detects a current density of the variable ND filter 104. When the state detecting unit 105 detects the current density of the variable ND filter 104, the system control unit 50 acquires a value of a detection signal of the density of the variable ND filter 104 from the state detecting unit 105. As a result, the system control unit 50 obtains the exposure changing speed which changes depending on the temperature of the variable ND filter 104 based on a change in the density detected by the state detecting unit 105. Further, when the state detecting unit 105 detects a current temperature of the variable ND filter 104, the system control unit 50 acquires a value of a detection signal of the temperature from the state detecting unit 105, and then acquires the density recorded in the nonvolatile memory 56 and so on in advance in association with the temperature as response characteristics. That is, based on the detected temperature of the variable ND filter 104, the system control unit 50 estimates the density by referring to the response characteristics recorded in advance, and obtains the exposure changing speed which changes depending on the temperature of the variable ND filter 104.

In step S102, the system control unit 50 calculates a current exposure of the image pickup apparatus 100. Specifically, the system control unit 50 calculates the current exposure based on the density of the variable ND filter 104, the f-number of the diaphragm 101, the accumulation time period in the image pickup unit 22, and the gain in the image processing unit 24, which relates to the exposure of the image pickup apparatus 100. In step S103, the system control unit 50 determines whether the current exposure of the image pickup apparatus 100 calculated in the step S102 reaches the target exposure of the image pickup apparatus 100. When determining that the current exposure of the image pickup apparatus 100 does not reach the target exposure of the image pickup apparatus 100, the system control unit 50 proceeds the process to step S104 in order to perform the exposure control for obtaining the target exposure. On the other hand, when determining that the current exposure of the image pickup apparatus 100 reaches the target exposure of the image pickup apparatus 100, the system control unit 50 proceeds the process to step S107.

In the step S104, the system control unit 50 instructs the variable ND filter 104 to change its density in order to perform the exposure control. Specifically, the system control unit 50 obtains, for example, the exposure condition for the variable ND filter 104 which corrects a difference of the current exposure of the image pickup apparatus 100 that is excess or deficient with respect to the target exposure of the image pickup apparatus 100. The system control unit 50 then instructs the variable ND filter 104 to change its density based on the exposure condition. In addition, when the state detecting unit 105 detects the temperature of the variable ND filter 104, the system control unit 50 instructs the system timer 53 to start counting an elapsed time period. In step S105, the system control unit 50 calculates a correction amount of another exposure parameter to be used for another exposure condition in order to compensate for the response delay of the variable ND filter 104 in the exposure control. The system control unit 50 may calculate, for example, a difference of the exposure changing characteristic line of the variable ND filter 104 with respect to the target exposure characteristic line in FIG. 2 as the correction amount. The exposure changing characteristic line of the variable ND filter 104 changes depending on the temperature of the variable ND filter 104 as shown in FIG. 3. The system control unit 50 also may calculate the correction amount with a residual instead of calculating the correction amount for correcting the difference of the variable Nd filter 104 as-is with respect to the target exposure characteristic line. In particular, taking characteristics of other members which is controlled under other exposure conditions into consideration, it may be allowable to calculate the correction amount which linearly changes on a time base or to calculate the correction amount which non-linearly changes stepwise. The correction amount may be allowable as long as an amount of residual with respect to the target exposure in a case where the exposure of the image pickup apparatus 100 after compensation by the exposure control is smaller as a whole than that in a case where the exposure of the image pickup apparatus 100 is not compensated for.

In step S106, the system control unit 50 controls another exposure changing means other than the variable ND filter 104 under the exposure control based on the correction amount calculated in the step S105. The exposure condition described here is not limited to the exposure condition for one member but may be the exposure conditions for a plurality of members. The system control unit 50 then changes an exposure parameter used for at least one of the exposure conditions of the f-number of the diaphragm 101, the accumulation time period in the image pickup unit 22, and the gain in the image processing unit 24. Namely, the system control unit 50 controls the another exposure conditions other than the first exposure condition for the variable ND filter 104. Accordingly, the exposure changing characteristic of the variable ND filter 104 is compensated for. As a result, when the first exposure condition for the variable ND filter 104 is controlled, the exposure changing speed same as that in a case where the exposure condition for the diaphragm 101 is controlled can be obtained.

Thereafter, the system control unit 50 returns the process to the step S101. the system control unit 50 repeatedly performs the processes from the step S101 to the step S106 until the system control unit 50 determines in the step S103 that the compensated current exposure of the image pickup apparatus 100 reaches the target exposure of the image pickup apparatus 100. In this case, when the system timer 53 counts the elapsed time period, it is preferred that the system control unit 50 performs the process in the step S101 every time when a predetermined elapsed time period has been counted. As a result of the processes from the step S101 to the step S106, the density of the variable ND filter 104 changes to correspond to the exposure condition for obtaining a predetermined target exposure. When the compensated current exposure of the image pickup apparatus 100 reaches the target exposure of the image pickup apparatus 100, the system control unit 50 proceeds the process to the step S107 through the determination in the step S103.

In the step S107, the system control unit 50 determines whether transition of the density of the variable ND filter 104 is in progress. As described above, the density of the variable ND filter 104 changes after the start of the exposure control until it corresponds to the target exposure of the image pickup apparatus 100 with a delay. Therefore, even when the compensated current exposure of the image pickup apparatus 100 reaches the target exposure of the image pickup apparatus 100, the density of the variable ND filter 104 does not reach the density corresponding to the target exposure of the image pickup apparatus 100 in some cases. In such cases, the system control unit 50 determines that the transition of the density of the variable ND filter 104 is in progress, and proceeds the process to step S108. After that, when the density of the variable ND filter 104 reaches the density corresponding to the target exposure of the image pickup apparatus 100, the system control unit 50 determines that the transition of the density of the variable ND filter 104 is not in progress, and ends the process in FIG. 4.

In the step S108, the system control unit 50 provides control to return values of the other exposure parameters used for the other exposure conditions that have compensated for the response delay of the variable ND filter 104 to values before compensation, and gradually returns the values of the other exposure parameters to the values before the compensation. With this control, the exposure of the image pickup apparatus 100 is kept substantially constant. Then, the system control unit 50 returns the process to the step S107. The system control unit 50 repeatedly performs the processes from the step S107 to the step S108 until the density of the variable ND filter 104 reaches the density corresponding to the target exposure of the image pickup apparatus 100 even without the compensation. When the density of the variable ND filter 104 reaches the density corresponding to the target exposure of the image pickup apparatus 100, and the values of the exposure parameters used for the other exposure conditions return to the values before the compensation, the system control unit 50 ends the process in FIG. 4 through determination in the step S107. After the target exposure of the image pickup apparatus 100 is obtained by controlling the plurality of exposure conditions including the exposure condition for the variable ND filter 104, the system control unit 50 returns the plurality of exposure conditions for the members other than the variable ND filter 104 to a state before the control over the variable ND filter 104 is started.

Figure 5:
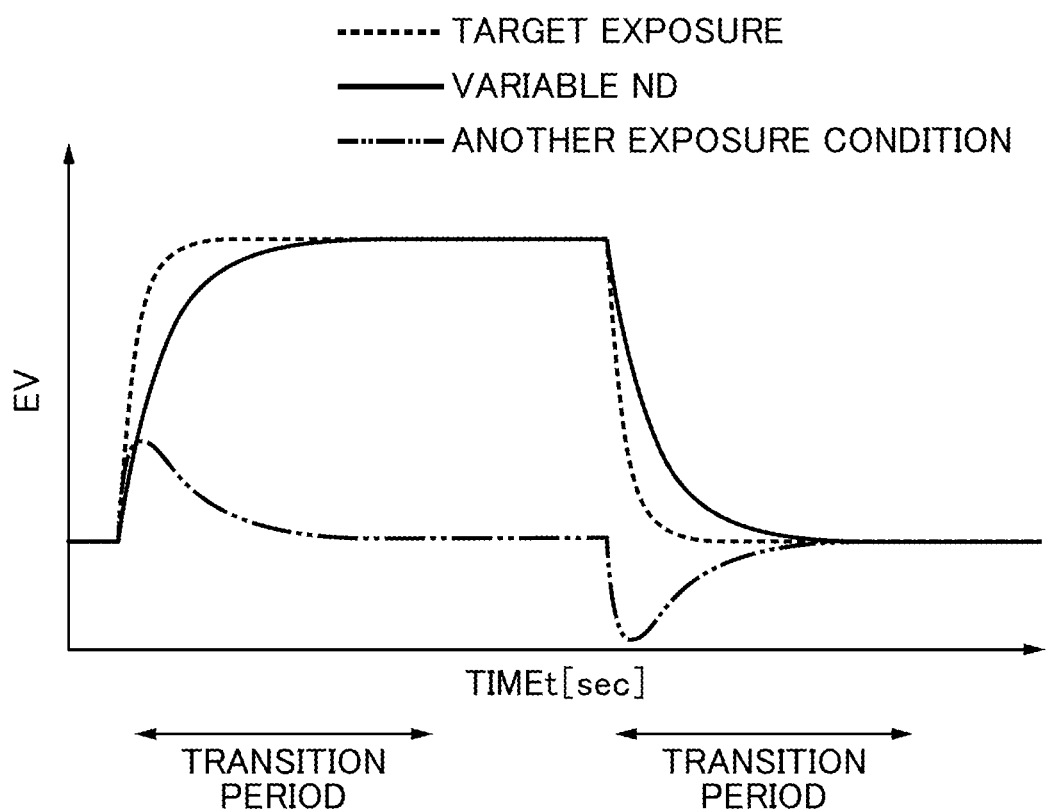
FIG. 5 is a graph showing exposure changing characteristics in the exposure control for compensating for the response delay of the variable ND filter in FIG. 1.

FIG. 5 is a graph showing exposure control characteristics in the exposure control for compensating for the response delay of the variable ND filter 104 in FIG. 1. In FIG. 5, an axis of abscissa indicates a time, and an axis of ordinate indicates an EV corresponding to the exposure set for the image pickup apparatus 100. Moreover, in FIG. 5, a continuous line indicates the exposure changing characteristic line of the variable ND filter 104, a dashed line indicates the changing characteristic line of the target exposure of the image pickup apparatus 100, and a two-dot chain line indicates an exposure changing characteristic line of another exposure condition which is used to compensate for the response delay of the variable ND filter 104.

Concerning the another exposure condition, the exposure control for compensation is performed for each transition period from when the exposure control over the variable ND filter 104 is started until the exposure condition for the variable ND filter 104 is obtained. At first, the system control unit 50 calculates a difference of the exposure changing speed which changes depending on the change in the state of the variable ND filter 104 based on the detection result obtained by the state detecting unit 105 with respect to a changing speed of the target exposure at a time of changing the target exposure of the image pickup apparatus 100. Then, the system control unit 50 changes the exposure conditions for the members other than the variable ND filter 104 so as to reduce the calculated difference. As a result, the exposure changing speed of the image pickup apparatus 100 as a whole becomes the changing speed of the target exposure immediately after the exposure control over the variable ND filter 104 is started. Namely, the exposure of the image pickup apparatus 100 can be the target exposure immediately after the exposure control over the variable ND filter 104 is started. Therefore, the image pickup apparatus 100 is able to perform image pickup with the target exposure immediately after the exposure control over the variable ND filter 104 is started without waiting for the target exposure to be obtained only by the variable ND filter 104.

As described above, the transition period from when the control to change the exposure condition for obtaining the target exposure is started until the target exposure is obtained is provided for the variable ND filter 104 according to the present embodiment. In the present embodiment, the control is provided so that the exposure conditions for the members other than the variable ND filter 104 are changed in the transition period. Therefore, when the exposure condition for the variable ND filter 104 is changed, the delay in the exposure changing speed of the variable ND filter 104 is compensated for by changing the exposure conditions for the plurality of members other than the variable ND filter 104. Accordingly, even when the member of which exposure changing speed is slow, such as the variable ND filter 104, is used for the exposure control of the image pickup apparatus 100, the delay in the exposure changing speed of the variable ND filter 104 is compensated for, and the target exposure of the image pickup apparatus 100 is obtained quickly. As a result, in the image pickup apparatus 100, it is possible to suppress increase in the delay in the exposure control of the image pickup apparatus 100 even when, for example, the variable ND filter 104 of which exposure changing speed is slow is used for the exposure control of the image pickup apparatus 100.

In the present embodiment, the state detecting unit 105 detects the current density or the current temperature of the variable ND filter 104, and the system control unit 50 obtains the current exposure of the variable ND filter 104 based on the detection result. Therefore, even when the density or the exposure of the variable ND filter 104 changes depending on the temperature of the variable ND filter 104, the system control unit 50 is able to obtain and compensate for the exposure of the variable ND filter 104 including variation.

Second Embodiment

Next, a description will be given of an image pickup apparatus 100 according to a second embodiment of the present invention. In the following description, only differences from the image pickup apparatus 100 according to the first embodiment described above will be explained. In the first embodiment described above, the other exposure conditions and the other exposure parameters which are controlled for the compensation in the step S106 are not specifically limited. However, for example, when the compensation is performed by changing the accumulation time period in the image pickup unit 22, a visibility of a moving subject may change unnaturally. Additionally, for example, when the compensation is performed by changing the gain in the image processing unit 24, a signal to noise ratio changes with a variation of the gain, and the change in the signal to noise ratio may affect an image quality. In particular, when the compensation is performed by changing the gain from one to less than one, a saturated part of an image may be colored. Further, for example, when the compensation is performed by changing the f-number of the diaphragm 101, a depth of field changes and a focusing state of a subject may change unnaturally. To cope with these concerns, in the present embodiment, the other exposure conditions and the other exposure parameters to be controlled for the compensation are selected.

Figure 6:
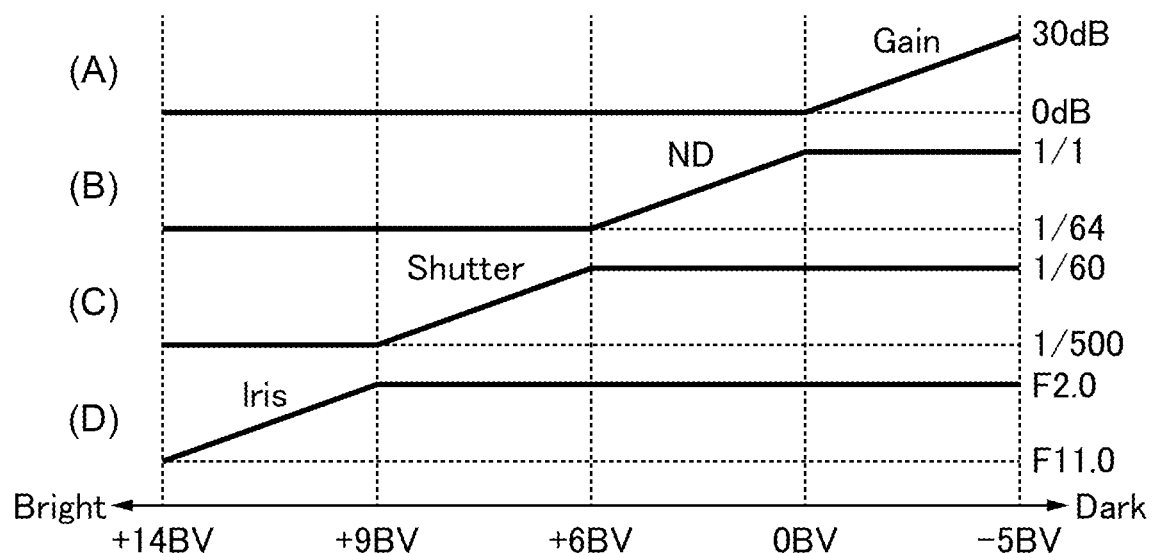
FIG. 6 is a program diagram which defines a control order and a control range for a plurality of exposure conditions in an image pickup apparatus according to a second embodiment of the present invention.

FIG. 6 is a program diagram which defines a control order and a control range for the plurality of exposure conditions in the image pickup apparatus 100 according to the second embodiment of the present invention. The program diagram in FIG. 6 defines the control order and the control range for the plurality of exposure conditions in a case where the exposure of the image pickup apparatus 100 is changed. Data of the program diagram is recorded in the non-volatile memory 56 and read and used by the system control unit 50 at the time of the exposure control. In FIG. 6, an axis of abscissa indicates a BV which shows a brightness of an environment. The BV corresponds to the exposure set for the image pickup apparatus 100.

In FIG. 6, (A) shows a gain in the image processing unit 24 (Gain), (B) shows the transmittance of the variable ND filter 104 (ND), (C) shows the accumulation time period in the image pickup unit 22 corresponding to the shutter speed (Shutter), and (D) shows the f-number of the diaphragm 101 (Iris). When the maximum value of +14 BV is obtained in an example of the program diagram in FIG. 6, the system control unit 50 controls the diaphragm 101 so that the f-number becomes F11.0. The system control unit 50 also controls the image pickup unit 22 so that the accumulation time period becomes 1/500 seconds. The system control unit 50 further controls the variable ND filter 104 so that the transmittance becomes 1/64. Moreover, the system control unit 50 controls the image processing unit 24 so that the gain in image processing becomes zero dB.

When the exposure of the image pickup apparatus 100 is gradually reduced from the maximum, the system control unit 50 changes the exposure based on the program diagram. At first, the system control unit 50 controls the diaphragm 101 so that the f-number changes from F11.0 to F2.0. With this control, an amount of light introduced into the image pickup unit 22 increases. When the f-number of the diaphragm 101 reaches F2.0 and the BV becomes +9 BV, the system control unit 50 then controls the image pickup unit 22 so that the accumulation time period is increased from 1/500 seconds to 1/60 seconds. When the accumulation time period in the image pickup unit 22 reaches 1/60 seconds and the BV becomes +6 BV, the system control unit 50 subsequently controls the variable ND filter 104 so that the transmittance is increased from 1/64 to one. When the transmittance of the variable ND filter 104 reaches one and the BV becomes ±0 BV, the system control unit 50 controls the image processing unit 24 so that the gain is increased from zero dB to 30 dB. By providing control so as to sequentially change the plurality of exposure conditions based on the data of the program diagram in FIG. 6, the system control unit 50 controls the exposure so that a fine image quality is secured for subjects with a wide range of brightness.

It should be noted that although in the program diagram in FIG. 6, the exposure is controlled for each exposure condition one-by-one, each exposure condition may be controlled stepwisely for a plurality of BV ranges divided in the program diagram. the exposure may not be controlled for a part of the plurality of the exposure conditions in the program diagram. The nonvolatile memory 56 of the image pickup apparatus 100 may record a plurality of program diagrams having different contents as to the exposure control. In this case, the system control unit 50 may select one program diagram based on a recording mode or a user operation, and sequentially control the plurality of the exposure conditions so as to obtain the target exposure based on a selected program diagram.

Figure 7:
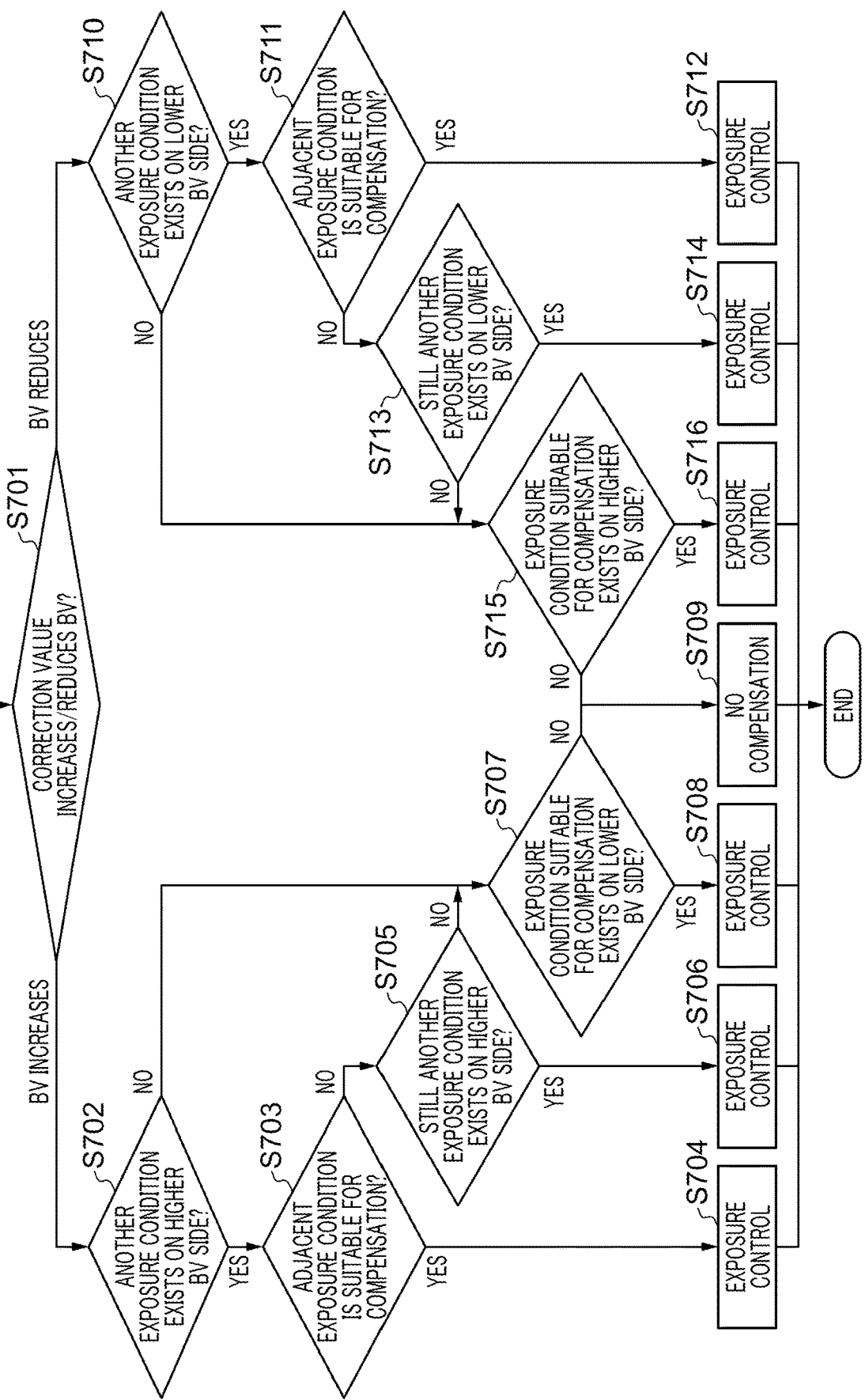
FIG. 7 is a flowchart showing an example of an exposure condition determination process for compensating for the exposure changing characteristic of the variable ND filter.

FIG. 7 is a flowchart showing an example of an exposure condition determination process for compensating for the exposure changing characteristic of the variable ND filter 104. The system control unit 50 performs the process in FIG. 7 in the step S106 in FIG. 4.

In step S701, the system control unit 50 determines whether a correction value which is used to compensate for the exposure changing characteristic of the variable ND filter 104 increases or reduces the BV. When determining that the correction value increases the BV, the system control unit 50 proceeds the process to step S702. On the other hand, when determining that the correction value reduces the BV, the system control unit 50 proceeds the process to step S710.

In the step S702, the system control unit 50 determines whether another exposure condition exists on a higher BV side in the control range than the transmittance of the variable ND filter 104 in the program diagram in use. In a case of the program diagram in FIG. 6, the accumulation time period in the image pickup unit 22 and the f-number of the diaphragm 101 exist on the higher BV side in the control range than the transmittance of the variable ND filter 104. Accordingly, the system control unit 50 determines that other exposure conditions exist and proceeds the process to step S703. On the other hand, in contrast to the program diagram in FIG. 6, when an exposure condition does not exist on the higher BV side in the control range than the transmittance of the variable ND filter 104, the system control unit 50 determines that another exposure condition does not exist and proceeds the process to step S707.

In the step S703, the system control unit 50 determines whether the accumulation time period in the image pickup unit 22, which is an exposure condition whose control range is adjacent to that of the transmittance of the variable ND filter 104 in the program diagram in use (hereinafter, merely referred to as "adjacent exposure condition"), is suitable for the exposure control for the compensation. Based on an exposure changing speed or a control resolution, for example, the system control unit 50 determines whether it is possible to perform the exposure control with the exposure changing speed and the control resolution adequate for obtaining the target exposure characteristic. For the exposure control for the compensation, an exposure condition whose exposure changing speed is faster than that of the first exposure condition for the variable ND filter 104 and whose control resolution is higher than that of the first exposure condition is suitable. When determining that the accumulation time period in the image pickup unit 22 as the adjacent exposure condition is suitable for the exposure condition for the compensation, the system control unit 50 proceeds the process to step S704. In the step S704, the system control unit 50 controls the exposure by changing the accumulation time period in the image pickup unit 22 as the adjacent exposure condition using the correction value which is used to compensate for the exposure changing characteristic of the variable ND filter 104. After that, the system control unit 50 ends the process in FIG. 7.

In step S705, the system control unit 50 determines whether still another exposure condition exists on the higher BV side in the control range than the transmittance of the variable ND filter 104 other than the adjacent exposure condition in the program diagram in use. When determining that the still another exposure condition exists, the system control unit 50 proceeds the process to step S706. On the other hand, when determining that the still another exposure condition does not exist, the system control unit 50 proceeds the process to step S707. In the case of the program diagram in FIG. 6, the f-number of diaphragm 101 exists on the higher BV side in the control range than the variable ND filter 104 other than the accumulation time period in the image pickup unit 22. Therefore, the system control unit 50 determines that the still another exposure condition exist and proceeds the process to the step S706. In the step S706, the system control unit 50 controls the exposure by changing the f-number of the diaphragm 101 as the still another exposure condition using the correction value which is used for compensate for the exposure changing characteristic of the variable ND filter 104. After that, the system control unit 50 ends the process in FIG. 7.

The step S707 is executed when another exposure condition which can be used to compensate for the exposure changing characteristic of the variable ND filter 104 does not exist on the higher BV side in the control range than the transmittance of the variable ND filter 104 in the program diagram in use. In the step S707, the system control unit 50 determines whether an opposite another exposure condition which satisfies the same requirements as described in the step S703 exists on a lower BV side in the control range than the transmittance of the variable ND filter 104 in the program diagram in use. In the case of the program diagram in FIG. 6, the gain in the image processing unit 24 exists on the lower BV side in the control range than the transmittance of the variable ND filter 104. Therefore, the system control unit 50 determines that the opposite another exposure condition exists and proceeds the process to step S708. On the other hand, when determining that the opposite another exposure condition does not exist, the system control unit 50 proceeds the process to step S709. In the step S708, the system control unit 50 controls the exposure by changing the gain in the image processing unit 24 as the opposite another exposure condition using the correction value which is used to compensate for the exposure changing characteristic of the variable ND filter 104. After that, the system control unit 50 ends the process in FIG. 7.

In the step S709, the system control unit 50 ends the process in FIG. 7 without performing the compensation by changing other exposure conditions other than the transmittance of the variable ND filter 104 using the correction value.

In step S710, the system control unit 50 determines whether another exposure condition exists on the lower BV side in the control range than the transmittance of the variable ND filter 104 in the program diagram in use. In the case of the program diagram in FIG. 6, the gain in the image processing unit 24 exists on the lower BV side in the control range than the transmittance of the variable ND filter 104. Therefore, the system control unit 50 determines that the another exposure condition exists and proceeds the process to step S711. On the other hand, in contrast to the program diagram in FIG. 6, when an exposure condition does not exist on the lower BV side in the control range than the transmittance of the variable ND filter 104, the system control unit 50 determines that another exposure condition does not exist and proceeds the process to step S715.

In the step S711, the system control unit 50 determines whether the gain in the image processing unit 24 as the adjacent exposure condition in the program diagram in use is suitable for the exposure control for the compensation. Based on the exposure changing speed or the control resolution, for example, the system control unit 50 determines whether it is possible to perform the exposure control with the exposure changing speed and the control resolution adequate for obtaining the target exposure characteristic. When determining that the gain in the image processing unit 24 as the adjacent exposure condition is suitable for the exposure condition for the compensation, the system control unit 50 proceeds the process to step S712. In the step S712, the system control unit 50 controls the exposure by changing the gain in the image processing unit 24 as the adjacent exposure condition using the correction value which is used to compensate for the exposure changing characteristic of the variable ND filter 104. After that, the system control unit 50 ends the process in FIG. 7.

In step S713, the system control unit 50 determines whether a still another exposure condition exists on a lower BV side in the control range than the transmittance of the variable ND filter 104 other than the adjacent exposure condition in the program diagram in use. When determining that the still another exposure condition exists, the system control unit 50 proceeds the process to step S714. On the other hand, when determining that the still another exposure condition does not exist, the system control unit 50 proceeds the process to step S715. In the case of the program diagram in FIG. 6, the still another exposure condition does not exist on the lower BV side in the control range than the transmittance of the variable ND filter 104 other than the gain in the image processing unit 24. Therefore, the system control unit 50 determines that the still another exposure condition does not exist and proceeds the process to the step S715. In the step S714, the system control unit 50 controls the exposure by changing the still another exposure condition using the correction value which is used to compensate for the exposure changing characteristic of the variable ND filter 104. After that, the system control unit 50 ends the process in FIG. 7.

The step S715 is executed when another exposure condition which can be used to compensate for the exposure changing characteristic of the variable ND filter 104 does not exist on the lower BV side in the control range than the transmittance of the variable ND filter 104 in the program diagram in use. In the step S715, the system control unit 50 determines whether an opposite another exposure condition which satisfies the same requirements as described in the step S711 exists on the higher BV side in the control range than the transmittance of the variable ND filter 104 in the program diagram in use. In the case of the program diagram in FIG. 6, the accumulation time period in the image pickup unit 22 and the f-number of the diaphragm 101 exist on the higher BV side in the control range than the transmittance of the variable ND filter 104. Therefore, the system control unit 50 determines that the opposite another exposure condition exists and proceeds the process to step S716. On the other hand, when determining that the opposite another exposure condition does not exist, the system control unit 50 proceeds the process to the step S709. In the step S716, the system control unit 50 controls the exposure by changing the opposite another exposure condition using the correction value which is used to compensate for the exposure changing characteristic of the variable ND filter 104. After that, the system control unit 50 ends the process in FIG. 7.

According to the exposure control for the compensation described above, even when the variable ND filter 104 which does not satisfy the target exposure characteristic is used for the exposure control of the image pickup apparatus 100, it is possible to control the exposure of the image pickup apparatus 100 with a target exposure changing speed. Moreover, an exposure condition whose control range is adjacent to the control range of the exposure condition for the variable ND filter 104 in a direction in which the correction value changes the BV value concerning an increasing/reducing direction of the BV is preferentially selectable as an exposure condition to be used for the exposure control for the compensation compared to an exposure condition whose control range is not adjacent to the control range of the exposure condition for the variable ND filter 104 and an exposure condition whose control range lies on a side opposite to the control range of the exposure condition for the variable ND filter 104 concerning the increasing/reducing direction of the BV. As a result, an influence on an image quality can be minimized.

Additionally, the system control unit 50 preferentially selects an exposure condition to be used for the exposure control later than the transmittance of the variable ND filter 104 in the program diagram, and provides control to change the selected exposure condition. In particular, when the first exposure condition for the variable ND filter 104 is changed, the system control unit 50 controls the exposure based on the program diagram with which another exposure condition is changed after the first exposure condition is changed. That is, the system control unit 50 selects the adjacent exposure condition to be used for the exposure control immediately after the variable ND filter 104 in the program diagram with the highest priority, and provides control to change the selected adjacent exposure condition. Namely, the system control unit 50 controls, as the another exposure condition, the exposure condition to be changed immediately after the first exposure condition with respect to the change in the brightness of the subject in the program diagram is used so as to compensate for the exposure changing speed of the first exposure condition. Incidentally, the adjacent exposure condition does not satisfy a predetermined reference performance in some cases. In such cases, the system control unit 50 selects an exposure condition which is to be used for the exposure control later than the transmittance of the variable ND filter 104 in the program diagram and satisfies the reference performance, and provides control to change the selected exposure condition. Furthermore, all exposure conditions to be used for the exposure control later than the transmittance of the variable ND filter 104 in the program diagram do not satisfy the reference performance in some cases. In such cases, the system control unit 50 selects an exposure condition which is to be used for the exposure control prior to the transmittance of the variable ND filter 104 in the program diagram and satisfies the reference performance, and provides control to change the selected exposure condition.

According to the present embodiment, the exposure during adjustment of the transmittance can be compensated for based on whether an amount of light is increased or reduced for compensating for the response delay of the variable ND filter 104. Moreover, according to the present embodiment, the exposure of the variable ND filter 104 during adjustment of the transmittance can be compensated for by using an exposure condition to be used for the exposure control after adjustment of the brightness by the variable ND filter 104.

Third Embodiment

Next, a description will be given of an image pickup apparatus 100 according to a third embodiment of the present invention. In the following description, differences from the image pickup apparatuses 100 according to the first and second embodiments described above will be explained.

FIG. 8 is a graph showing exposure control characteristics in an exposure control for compensating for a response delay of the variable ND filter 104 in FIG. 1 in the image pickup apparatus 100 according to the third embodiment of the present invention. In FIG. 8, an axis of abscissa indicates a time, and an axis of ordinate indicates an EV corresponding to an exposure set for the image pickup apparatus 100. Moreover, in FIG. 8, a continuous line indicates the exposure changing characteristic line of the variable ND filter 104, a dashed line indicates the changing characteristic line of the target exposure, and a one-dot chain line and a two-dot chain line indicate exposure changing characteristic lines of a plurality of other exposure conditions which are used to compensate for the response delay of the variable ND filter 104.

At timing T0 in FIG. 8, the system control unit 50 starts the exposure control over the variable ND filter 104 in order to control the exposure of the image pickup apparatus 100. As described earlier, the density of the variable ND filter 104 changes after the start of the exposure control with a delay. The system control unit 50 performs the exposure control for compensating for the response delay of the variable ND filter 104 by using another exposure condition every transition period from when the exposure control over the variable ND filter 104 is started until the target exposure of the image pickup apparatus 100 is obtained by the variable ND filter 104. The system control unit 50 calculates a difference of the exposure changing speed which changes depending on the change in the state of the variable ND filter 104 based on the detection result obtained by the state detecting unit 105 with respect to the changing speed of the target exposure at a time of changing the target exposure of the image pickup apparatus 100. The system control unit 50 also changes the other exposure conditions for the members other than the variable ND filter 104 so as to reduce the calculated difference. As a result, the exposure of the image pickup apparatus 100 as a whole becomes the target exposure of the image pickup apparatus 100 immediately after the exposure control over the variable ND filter 104 is started. Therefore, the image pickup apparatus 100 is able to perform image pickup apparatus with the target exposure immediately after the exposure control over the variable ND filter 104 is started without waiting for the target exposure to be obtained only by the variable ND filter 104.

Then, at timing T1 in FIG. 8, the system control unit 50 starts a new exposure control over the variable ND filter 104. The system control unit 50 starts the new exposure control over the variable ND filter 104 before the target exposure of the image pickup apparatus 100 is obtained by the variable ND filter 104. However, in an actual image pickup environment, while the exposure control for the compensation is being performed by changing the exposure so that the EV is increased to change another exposure condition, the system control unit 50 inverts a control direction of the exposure to reduce the EV in some cases. In such cases, the system control unit 50 changes a correction amount of a first another exposure condition which is being controlled for the compensation so far to a correction amount for the new exposure control over the variable ND filter 104. As a result, as shown by the two-dot chain line in FIG. 8, the correction amount for the compensation concerning the first another exposure condition drastically reduces. After that, at timing T2, the first another exposure condition returns to a state before the compensation, and the correction amount for the compensation becomes zero. Then, the system control unit 50 starts controlling a second another exposure condition other than the first another exposure condition by using a correction amount which is used to compensate for the response delay of the variable ND filter 104 after inversion of the control direction of the exposure. The system control unit 50 controls the second another exposure condition until timing T3 in which the target exposure of the image pickup apparatus 100 is obtained by the exposure based on the density of the variable ND filter 104.

Accordingly, even when the control direction of the exposure is inverted into an opposite direction during the exposure control over the variable ND filter 104, the system control unit 50 obtains the target exposure of the image pickup apparatus 100 immediately after the inversion of the control direction without being affected by the response delay of the variable ND filter 104. Moreover, the system control unit 50 can perform the exposure control in a state in which an influence on an image quality is minimized.

As described above, in the present embodiment, the system control unit 50 inverts the control direction of the exposure in the transition period during which the exposure of the variable ND filter 104 is transitioned to the target exposure of the image pickup apparatus 100. On this occasion, the system control unit 50 provides control to return the state of the another exposure condition which is being controlled for compensating for the response delay of the variable ND filter 104 to the state before the compensation. After the state of the another exposure condition is returned to the state before the compensation, the system control unit 50 provides control to change a still another exposure condition other than the density of the variable ND filter 104 and the another exposure condition. That is, in a case where the control direction of the first exposure condition is inverted while the first exposure condition is changed toward the target exposure and a second exposure condition as the another exposure condition is used to compensate for the exposure changing speed of the first exposure condition, the system control unit 50 returns a value of the second exposure condition to a value before changing the same. Then, the system control unit 50 provides control to compensate for the exposure changing speed of the first exposure condition by using a third exposure condition other than the second exposure condition as the another exposure condition.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-007678, filed Jan. 21, 2020, which is hereby incorporated by reference wherein in its entirety.

What is claimed is:

1. An image pickup apparatus capable of changing a plurality of exposure conditions for changing an exposure at a time of image pickup of a subject, the image pickup apparatus comprising:
at least one processor or circuit, the at least one processor or circuit functioning in accordance with a program stored in a memory as:
a control unit that calculates a target exposure at the time of image pickup of the subject and controls the exposure according to the target exposure,
wherein, in a transition period from when control of the exposure for changing a first exposure condition according to the target exposure is started until the exposure reaches the target exposure, (i) the control unit determines whether another exposure condition other than the first exposure condition among the plurality of exposure conditions is suitable for compensating for an exposure changing speed of the first exposure condition and (ii) the control unit, in response to a determination that the another exposure condition is suitable for compensating for the exposure changing speed of the first exposure condition, changes the another exposure condition so that the exposure changing speed of the first exposure condition is compensated for, and
wherein the another exposure condition that is changed to compensate for the exposure changing speed of the first exposure condition is an exposure condition that is changed immediately after changing of the first exposure condition is completed with respect to a change in a brightness of the subject.

2. The image pickup apparatus according to claim 1, wherein the first exposure condition is an exposure condition for a transmittance variable element which is capable of changing a transmittance by an electrical control.

3. The image pickup apparatus according to claim 2, wherein after the exposure reaches the target exposure, the control unit returns a value of the another exposure condition which has been changed to compensate for the exposure changing speed of the first exposure condition to a value before the change.

4. The image pickup apparatus according to claim 3, the at least processor or circuit further functions as:
an exposure state detecting unit that detects or estimates a state of the transmittance variable element,
wherein the control unit changes the another exposure condition so that a difference of the exposure changing speed which changes depending on a change in the state of the transmittance variable element based on a detection result of the exposure state detecting unit with respect to a changing speed of the target exposure is reduced.

5. The image pickup apparatus according to claim 4, wherein the exposure state detecting unit detects a density of the transmittance variable element, and
the control unit obtains the exposure changing speed which changes depending on the change in the state of the transmittance variable element, based on a change in the density of the transmittance variable element detected by the exposure state detecting unit.

6. The image pickup apparatus according to claim 4, wherein the exposure state detecting unit detects a temperature of the transmittance variable element, and
the control unit obtains the exposure changing speed which changes depending on the change in the state of the transmittance variable element based on the temperature of the transmittance variable element detected by the exposure state detecting unit.

7. The image pickup apparatus according to claim 1, wherein the another exposure condition is faster in the exposure changing speed than the first exposure condition and is higher in a control resolution than the first exposure condition.

8. The image pickup apparatus according to claim 1, wherein in a case where a control direction of the first exposure condition is inverted when the first exposure condition is changed toward the exposure target and a second exposure condition is being used as the another exposure condition to compensate for the exposure changing speed of the first exposure condition, the control unit provides control so that a value of the second exposure condition is returned to a value before the change, and a third exposure condition different from the second exposure condition is used as the another exposure condition to compensate for the exposure changing speed of the first exposure condition.

9. The image pickup apparatus according to claim 1, wherein before the control unit determines whether the another exposure condition is suitable for compensating for the exposure changing speed of the first exposure condition, the control unit determines whether a correction value used to compensate for the exposure changing speed of the first exposure condition increases a brightness value, and in a case where the control unit determines that the correction value used to compensate for the exposure changing speed of the first exposure condition increases the brightness value, the control unit further determines whether the another exposure condition exists on a higher brightness value side, in a control range for the plurality of exposure conditions, than the first exposure condition.

10. A control method for an image pickup apparatus capable of changing a plurality of exposure conditions for changing an exposure at a time of image pickup of a subject, the control method comprising:

calculating a target exposure at the time of image pickup of the subject and controlling the exposure according to the target exposure, wherein in controlling, in a transition period from when control of the exposure for changing a first exposure condition according to the target exposure is started until the exposure reaches the target exposure, (i) it is determined whether another exposure condition other than the first exposure condition among the plurality of exposure conditions is suitable for compensating for an exposure changing speed of the first exposure condition and (ii) in response to a determination that the another exposure condition is suitable for compensating for the exposure changing speed of the first exposure condition, the another exposure condition is changed so that the exposure changing speed of the first exposure condition is compensated for, and wherein in controlling, the another exposure condition that is changed to compensate for the exposure changing speed of the first exposure condition is an exposure condition that is changed immediately after changing of the first exposure condition is completed with respect to a change in a brightness of the subject.

11. A non-transitory computer-readable storage medium storing a program for causing a computer to execute a control method for an image pickup apparatus capable of changing a plurality of exposure conditions for changing an exposure at a time of image pickup of a subject, the control method comprising:

calculating a target exposure at the time of image pickup of the subject and controlling the exposure according to the target exposure, wherein in controlling, in a transition period from when control of the exposure for changing a first exposure condition according to the target exposure is started until the exposure reaches the target exposure, (i) it is determined whether another exposure condition other than the first exposure condition among the plurality of exposure conditions is suitable for compensating for an exposure changing speed of the first exposure condition and (ii) in response to a determination that the another exposure condition is suitable for compensating for the exposure changing speed of the first exposure condition, the another exposure condition is changed so that the exposure changing speed of the first exposure condition is compensated for, and wherein in controlling, the another exposure condition that is changed to compensate for the exposure changing speed of the first exposure condition is an exposure condition that is changed immediately after changing of the first exposure condition is completed with respect to a change in a brightness of the subject.

* * * * *